United States Patent
Choi et al.

(10) Patent No.: US 12,239,283 B2
(45) Date of Patent: Mar. 4, 2025

(54) ROBOT CLEANER AND METHOD FOR CONTROLLING THE SAME

(71) Applicant: LG ELECTRONICS INC., Seoul (KR)

(72) Inventors: Juno Choi, Seoul (KR); Janghun Cheong, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 218 days.

(21) Appl. No.: 17/798,364

(22) PCT Filed: Sep. 1, 2020

(86) PCT No.: PCT/KR2020/011685
§ 371 (c)(1),
(2) Date: Aug. 9, 2022

(87) PCT Pub. No.: WO2021/182693
PCT Pub. Date: Sep. 16, 2021

(65) Prior Publication Data
US 2023/0070133 A1    Mar. 9, 2023

(30) Foreign Application Priority Data
Mar. 10, 2020   (KR) .................. 10-2020-0029501

(51) Int. Cl.
*A47L 9/28*   (2006.01)
*A47L 9/00*   (2006.01)
(Continued)

(52) U.S. Cl.
CPC ............ *A47L 9/2805* (2013.01); *A47L 9/009* (2013.01); *A47L 9/2852* (2013.01); *A47L 9/30* (2013.01);
(Continued)

(58) Field of Classification Search
CPC ...... A47L 9/2805; A47L 9/009; A47L 9/2852; A47L 9/30; A47L 11/28; A47L 11/4002;
(Continued)

(56) References Cited

U.S. PATENT DOCUMENTS

2016/0104044 A1* 4/2016 Noh ................... G06V 20/10
901/1

FOREIGN PATENT DOCUMENTS

DE    10-2005-020311   * 10/2013
EP    2672287           12/2013
(Continued)

OTHER PUBLICATIONS

International Search Report dated Dec. 21, 2020 issued in Application No. PCT/KR2020/011685.
(Continued)

*Primary Examiner* — Muhammad Shafi
(74) *Attorney, Agent, or Firm* — KED & ASSOCIATES, LLP

(57) ABSTRACT

Disclosed is a robot cleaner including a light source for irradiating light, a sensor for sensing that the light irradiated from the light source is reflected, and a controller that processes an image using the light sensed by the sensor to calculate a distance value of an individual location of the corresponding image, wherein it is determined that there is an obstacle when there is a dead zone in the image processed by the controller.

9 Claims, 6 Drawing Sheets

(51) Int. Cl.
*A47L 9/30* (2006.01)
*A47L 11/28* (2006.01)
*A47L 11/40* (2006.01)
*G05D 1/00* (2006.01)
*G06T 7/514* (2017.01)

(52) U.S. Cl.
CPC ........... *A47L 11/28* (2013.01); *A47L 11/4002* (2013.01); *A47L 11/4011* (2013.01); *A47L 11/4061* (2013.01); *A47L 11/4066* (2013.01); *G05D 1/0238* (2013.01); *G05D 1/0246* (2013.01); *G06T 7/514* (2017.01); *A47L 2201/04* (2013.01); *G06T 2207/10028* (2013.01)

(58) Field of Classification Search
CPC .............. A47L 11/4011; A47L 11/4061; A47L 11/4066; A47L 2201/04; A47L 9/2826; G05D 1/0238; G05D 1/0246; G05D 1/0221; G05D 1/0251; G05D 1/0242; G06T 7/514; G06T 2207/10028; G06T 7/50; B25J 9/1666; B25J 9/1676; B25J 11/0085; B25J 19/021

USPC .......................................................... 701/26
See application file for complete search history.

(56) References Cited

FOREIGN PATENT DOCUMENTS

| EP | 3007025 | * | 4/2016 |
| EP | 3112897 | * | 1/2017 |
| JP | 2017-074191 | | 4/2017 |
| JP | 2017-130098 | | 7/2017 |
| KR | 101395892 | * | 5/2014 |
| KR | 10-2017-0065620 | | 6/2017 |
| KR | 10-2018-0080877 | | 7/2018 |

OTHER PUBLICATIONS

Extended European Search Report dated Jul. 24, 2024 issued in Application No. 20924105.8.

* cited by examiner

ROBOT CLEANER AND METHOD FOR CONTROLLING THE SAME

CROSS-REFERENCE TO RELATED PATENT APPLICATIONS

This application is a U.S. National Stage Application under 35 U.S.C. § 371 of PCT Application No. PCT/KR2020/011685, filed Sep. 1, 2020, which claims priority to Korean Patent Application No. 10-2020-0029501, filed Mar. 10, 2020, whose entire disclosures are hereby incorporated by reference.

TECHNICAL FIELD

The present disclosure relates to a robot cleaner and a method for controlling the same, and more particularly, to a robot cleaner and a method for controlling the same capable of detecting an obstacle using a depth image and avoiding the obstacle.

BACKGROUND ART

In general, robots have been developed for industrial use and have been responsible for a part of factory automation. In recent years, fields to which robots are applied have been further expanded, so that medical robots, aerospace robots, and the like have been developed, and household robots that may be used in general homes are also being made.

A representative example of the household robot is a robot cleaner, which is a kind of home appliance that sucks surrounding dust or foreign matter to perform cleaning while traveling by itself in a certain region. Such a robot cleaner is generally equipped with a rechargeable battery and an obstacle sensor for avoiding an obstacle while traveling, so that the robot cleaner may perform the cleaning while traveling by itself.

JP 2011-254637, which is a prior art, discloses a technology in which a robot cleaner travels until approaches a wall face and stops.

However, when a robot cleaner comes into contact with an obstacle, a collision with the obstacle occurs due to a travel speed of the robot cleaner, and thus damage to the robot cleaner or the obstacle may occur. In addition, there is a need for the robot cleaners to recognize the obstacle more efficiently.

DISCLOSURE OF INVENTION

Technical Problem

The present disclosure is to solve the above problems, and the present disclosure is to provide a robot cleaner and a method for controlling the same capable of sensing an obstacle using a depth image.

In addition, the present disclosure is to provide a robot cleaner and a method for controlling the same capable of avoiding the obstacle so as not to collide with the obstacle when the obstacle is sensed.

Solution to Problem

The present disclosure provides a robot cleaner and a method for controlling the same that may determine whether there is an obstacle and whether the robot cleaner approaches the obstacle using a depth image. A dead zone may be determined through the depth image. The dead zone means a section whose distance is not able to be measured because of a too close location or too strong light. In this case, a distance measurement value is 0 (not measurable). As the robot cleaner approaches the obstacle, a size of the dead zone increases. Using such information, the robot cleaner may determine whether the robot cleaner approaches the obstacle.

A robot cleaner body is damaged due to a collision or falls when recognizing a frame as a wall face. In the present disclosure, the robot cleaner may not come into contact with the obstacle using the depth image. When the robot cleaner approaches the wall, a distance to the wall is estimated based on a size of a dead zone on an image generated by light saturation.

The present disclosure provides a robot cleaner including a light source for irradiating light, a sensor for sensing that the light irradiated from the light source is reflected, and a controller that processes an image using the light sensed by the sensor to calculate a distance value of an individual location of the corresponding image, wherein it is determined that there is an obstacle when there is a dead zone in the image processed by the controller.

In addition, the present disclosure provides a method for controlling a robot cleaner including irradiating, by a light source, light, receiving, by a sensor, the light irradiated from the light source and reflected on an object, processing an image received from the sensor to contain a distance value of an individual location, and identifying that there is a dead zone in the image-processed information, wherein it is determined that there is an obstacle when there is the dead zone.

Advantageous Effects of Invention

According to the present disclosure, the existence of the obstacle may be determined using the depth image. In addition, when there is the obstacle, it may be sensed that the robot cleaner moves toward the obstacle, so that the robot cleaner may avoid the obstacle without colliding with the obstacle.

In addition, according to the present disclosure, a big obstacle such as a wall may be determined, so that the robot cleaner may be prevented from hitting the wall and being damaged.

MODE FOR THE INVENTION

Figure 1:
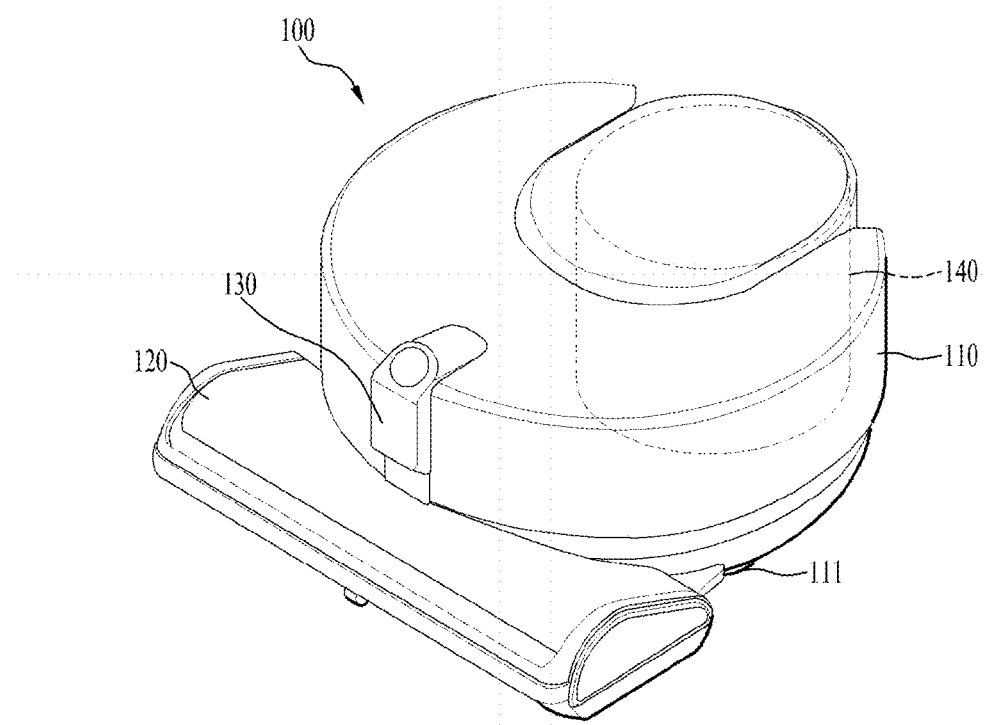
FIG. 1 is a perspective view of a robot cleaner according to an embodiment.

Hereinafter, a preferred embodiment according to the present disclosure that may specifically realize the above object will be described with reference to the accompanying drawings.

In such process, a size or a shape of a component shown in the drawings may be exaggerated for clarity and convenience of description. Moreover, terms specifically defined in consideration of the composition and operation according to the present disclosure may vary depending on the intention or custom of the user or operator. Definitions of such terms should be made based on the contents throughout this specification.

Figure 2:
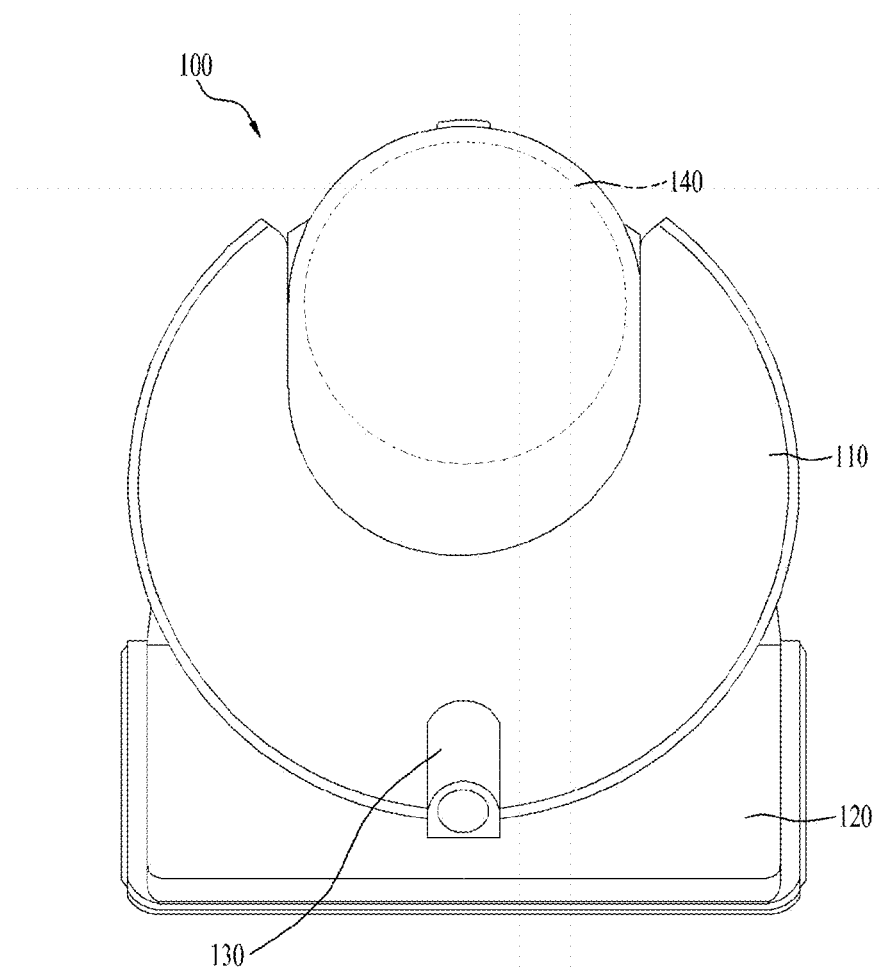
FIG. 2 is a plan view of FIG. 1.
Figure 3:
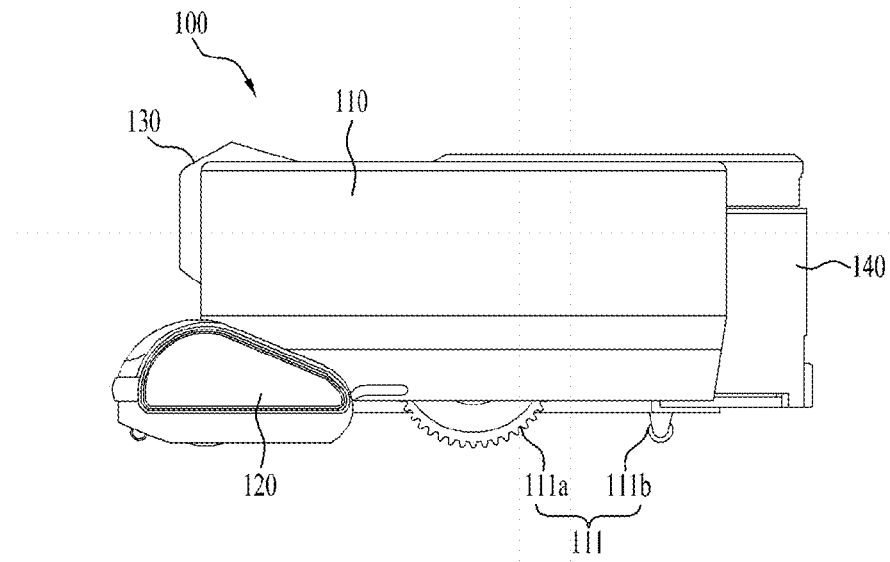
FIG. 3 is a side view of FIG. 1.

Referring to FIGS. 1 to 3, a robot cleaner 100 performs a function of cleaning a floor while traveling by itself in a certain region. The cleaning of the floor referred herein includes sucking dust (including foreign matter) from the floor or mopping the floor.

The robot cleaner 100 includes a cleaner body 110, a suction unit 120, a sensing unit 130, and a dust collection vessel 140.

The cleaner body 110 includes a controller (not shown) for controlling the robot cleaner 100 and a wheel unit 111 for the traveling of the robot cleaner 100. The robot cleaner 100 may be moved back and forth and left and right, or rotated by the wheel unit 111.

The wheel unit 111 includes main wheels 111a and sub-wheels 111b.

The main wheels 111a may be respectively arranged on both sides of the cleaner body 110 to rotate in one direction or the other direction in response to a control signal of the controller. The main wheels 111a may be driven independently of each other. For example, the main wheels 111a may be respectively driven by different motors.

The sub-wheels 111b support the cleaner body 110 together with the main wheels 111a, and assist the traveling of the robot cleaner 100 by the main wheels 111a. Such sub-wheels 111b may also be arranged in the suction unit 120 to be described later.

As described above, as the controller controls the driving of the wheel unit 111, the robot cleaner 100 autonomously travels on the floor.

In one example, the cleaner body 110 is equipped with a battery (not shown) that supplies power to the robot cleaner 100. The battery may be rechargeable and detachable from a bottom face of the cleaner body 110.

The suction unit 120 is disposed to protrude from one side of the cleaner body 110 and sucks air containing dust. The one side may be a side on which the cleaner body 110 travels in a forward direction F, that is, a front side of the cleaner body 110.

The suction unit 120 may be detachably coupled to the cleaner body 110. When the suction unit 120 is separated from the cleaner body 110, a mop module (not shown) may be detachably coupled to the cleaner body 110 by replacing the separated suction unit 120. Therefore, when a user wants to remove the dust from the floor, the user may mount the suction unit 120 on the cleaner body 110. In addition, when the user wants to mop the floor, the user may mount the mop module on the cleaner body 110.

The sensing unit 130 is disposed on the cleaner body 110. As shown, the sensing unit 130 may be disposed on the one side of the cleaner body 110 where the suction unit 120 is located, that is, the front side of the cleaner body 110.

The sensing unit 130 may be disposed to overlap the suction unit 120 in a vertical direction of the cleaner body 110. The sensing unit 130 is disposed above the suction unit 120 to sense an obstacle, a terrain object, or the like located in front of the robot cleaner such that the suction unit 120 located at the frontmost portion of the robot cleaner 100 does not collide with the obstacle.

The sensing unit 130 additionally performs another sensing function in addition to such sensing function. This will be described in detail later.

Figure 4:
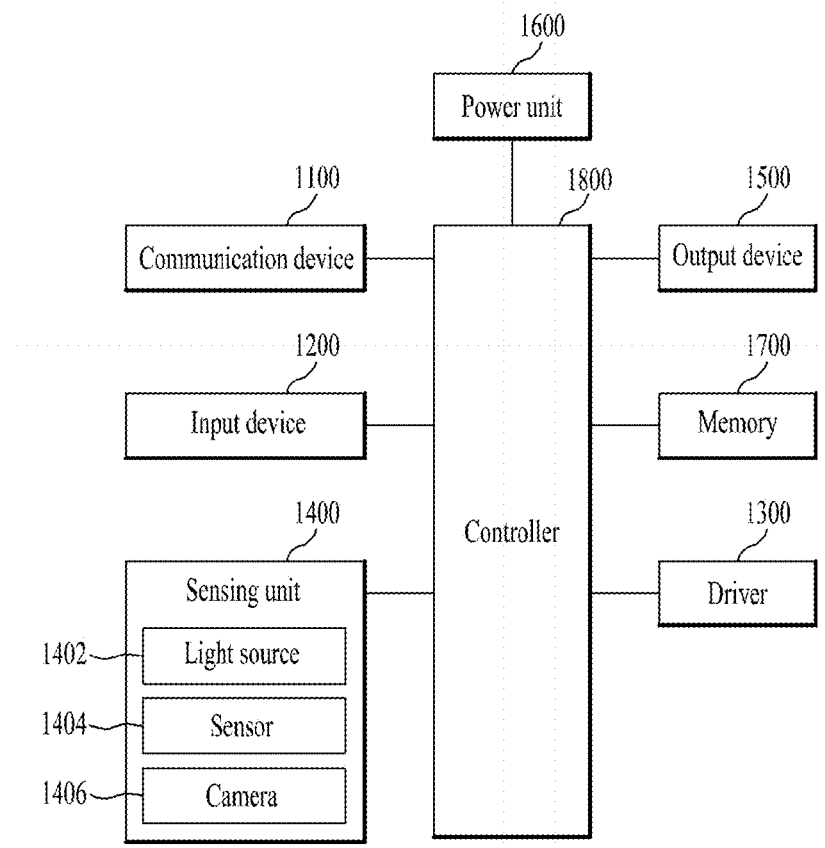
FIG. 4 is a block diagram showing components of a robot cleaner according to an embodiment.

In FIG. 4 below, an embodiment associated with components of the robot cleaner 100 will be described.

The robot cleaner 100 according to an embodiment of the present disclosure may include at least one of a communication device 1100, an input device 1200, a driver 1300, a sensing unit 1400, an output device 1500, a power unit 1600, a memory 1700, and a controller 1800, or a combination thereof.

In this connection, the components shown in FIG. 4 are not essential, so that a robot cleaner having more or fewer components than that may be implemented. Hereinafter, each of the component will be described.

First, the power supply 1600 includes a battery that may be charged by an external commercial power source to supply power into the mobile robot.

The power supply 1600 may supply driving power to each of the components included in the mobile robot, thereby supplying operation power required for the mobile robot to travel or perform a specific function.

In this connection, the controller 1800 may sense a remaining power of the battery, and control the mobile robot to move to the charging device connected to the external commercial power source when the remaining power is insufficient, thereby charging the battery by receiving charging current from the charging device. The battery may be connected to a battery sensor, so that the remaining power of the battery and a state of charge may be transmitted to the controller 1800. The output device 1500 may display the remaining power of the battery on a screen by the controller.

The battery may be located at a lower portion of a center of the robot cleaner or may be located on one of left and right sides. In the latter case, the mobile robot may further include a counterweight to eliminate weight bias of the battery.

The controller 1800 plays a role of processing information based on an artificial intelligence technology, which may include at least one module that performs at least one of learning of information, inference of information, perception of information, and processing of natural language.

The controller 1800 may use a machine learning technology to perform at least one of the learning, the inference, and the processing of a vast amount of information (big data) such as information stored in the cleaner, surrounding environment information, and information stored in an external communicable storage. In addition, the controller 1800 may predict (or infer) one or more executable operations of the cleaner using the information learned using the machine learning technology, and control the cleaner such that an operation with the highest realization among the one or more predicted operations is executed.

The machine learning technology is a technology, based on at least one algorithm, of collecting and learning large-scale information, and determining and predicting information based on the learned information. The learning of the information is an operation of quantifying a relationship between information and information by identifying characteristics, rules, and criteria of determination of the information, and predicting new data using a quantified pattern.

An algorithm used in the machine learning technology may be an algorithm based on statistics, and may be, for example, a decision tree that uses a tree structure as a prediction model, an artificial neural network that mimics a structure and a function of a neural network of a living thing, genetic programming based on an evolution algorithm of the living thing, clustering that distributes observed examples into subsets called clusters, a Monte Carlo method that calculates function values with probability through randomly extracted random numbers, and the like.

As a field of the machine learning technology, a deep learning technology is a technology of performing at least one of the learning, the determination, and the processing of the information using an artificial neural network (deep neuron network, DNN) algorithm. The artificial neural network (DNN) may have a structure of connecting layers with each other and transferring data between the layers. Such deep learning technology may learn a vast amount of information through the artificial neural network (DNN) using a graphic processing unit (GPU) optimized for parallel computation.

The controller 1800 may use training data stored in an external server or in the memory, and may be equipped with a learning engine that detects features for recognizing a predetermined object. In this connection, the features for recognizing the object may include a size, a shape, a shadow, and the like of the object.

Specifically, in the controller 1800, when some of images acquired through a camera disposed in the cleaner are input into the learning engine, the learning engine may recognize at least one object or living thing contained in the input images.

As such, when applying the learning engine to the travel of the cleaner, the controller 1800 may recognize whether an obstacle, such as a chair leg, a fan, or a certain type of balcony gap, that interferes with the travel of the cleaner exists around the cleaner, so that efficiency and reliability of the cleaner travel may be increased.

In one example, the learning engine as described above may be mounted on the controller 1800 or on the external server. When the learning engine is mounted on the external server, the controller 1800 may control the communication device 1100 to transmit at least one image, which is an analysis target, to the external server.

The external server may recognize the at least one object or living thing contained in the corresponding image by inputting the image transmitted from the cleaner into the learning engine. In addition, the external server may transmit information associated with a recognition result back to the cleaner.

In this connection, the information associated with the recognition result may include information associated with the number of objects contained in the image, which is the analysis target, and a name of each object.

In one example, the driver 1300 includes a motor, and drives the motor to rotate the left and right main wheels in both directions, thereby turning or moving the body. The driver 1300 may allow the body of the mobile robot to move back and forth and left and right, to travel in a curved manner, or to turn in place.

In one example, the input device 1200 receives various control commands for the robot cleaner from the user. The input device 1200 may include at least one button. For example, the input device 1200 may include an identification button, a setting button, and the like. The identification button is a button for receiving a command for identifying sensing information, obstacle information, location information, and map information from the user. The setting button is a button for receiving a command for setting the information from the user.

In addition, the input device 1200 may include an input resetting button for cancelling a previous user input and receiving a user input again, a delete button for deleting a preset user input, a button for setting or changing an operating mode, a button for receiving a command to return to the charging device, and the like.

In addition, the input device 1200 may be installed on a top face of the mobile robot as a hard key, a soft key, a touch pad, and the like. In addition, the input device 1200 may have a form of a touch screen together with the output device 1500.

In one example, the output device 1500 may be installed on the top face of the mobile robot. In one example, an installation location or an installation form may become different. For example, the output device 1500 may display a battery state, a travel scheme, or the like on a screen.

In addition, the output device 1500 may output information of a status of an interior of the mobile robot detected by the sensing unit 1400, for example, current status of each component included in the mobile robot. In addition, the output device 1500 may display information of a status of an exterior detected by the sensing unit 1400, the obstacle information, the location information, the map information, and the like on the screen. The output device 1500 may be formed as one of a light emitting diode (LED), a liquid crystal display (LCD), a plasma display panel, and an organic light emitting diode (OLED).

The output device 1500 may further include sound output means for aurally outputting an operation process of the mobile robot performed by the controller 1800 or an operation result. For example, the output device 1500 may output a warning sound to the outside in response to a warning signal generated by the controller 1800.

In one example, the communication device 1100 is connected to a terminal device and/or another device located within a specific region (in this specification, the term "home appliance" will be used interchangeably) through one of wired, wireless, and satellite communication schemes to transmit and receive signals and data.

In one example, the memory 1700 stores a control program that controls or drives the robot cleaner and data generated therefrom. The memory 1700 may store audio information, image information, the obstacle information, the location information, the map information, and the like. In addition, the memory 1700 may store information associated with a travel pattern.

In one example, the sensing unit 1400 may include an external signal sensor and a cliff sensor.

The external signal sensor may sense an external signal of the mobile robot. The external signal sensor may be, for example, an infrared ray sensor, an ultrasonic sensor, a radio frequency sensor (RF sensor), and the like.

The mobile robot may identify a location and a direction of a charging device by receiving a guide signal generated by the charging device using the external signal sensor. In this connection, the charging device may transmit the guide signal indicating the direction and a distance such that the mobile robot is able to return. That is, the mobile robot may receive the signal transmitted from the charging device to determine the current location and set a moving direction to return to the charging device.

In one example, the cliff sensor may sense the obstacle on the floor that supports the body of the mobile robot mainly using various types of optical sensors.

That is, the cliff sensor is installed on a rear face of the mobile robot on the floor, but the cliff sensor is able to be installed at different locations based on a type of the mobile robot. The cliff sensor is for sensing the obstacle on the floor by being located on the rear face of the mobile robot. The cliff sensor may be an infrared ray sensor, an ultrasonic sensor, an RF sensor, a position sensitive detector (PSD)

sensor, and the like equipped with a light emitter and a light receiver like the obstacle sensor.

As an example, one of the cliff sensors may be installed at a front portion of the mobile robot, and the other two cliff sensors may be installed at a relatively rear portion.

For example, the cliff sensor may be the PSD sensor, but may be composed of a plurality of different types of sensors.

The controller 1800 may measure an infrared ray angle between a light emission signal of an infrared ray emitted by the cliff sensor toward the ground and a reflection signal received by being reflected by the obstacle to sense the cliff and analyze a depth thereof.

In one example, the controller 1800 may determine whether to pass the cliff based on a ground condition of the cliff sensed using the cliff sensor, and may determine whether to pass the cliff based on the determination result. For example, the controller 1800 determines whether the cliff exists and the depth of the cliff using the cliff sensor, and then passes the cliff only when the reflection signal is sensed through the cliff sensor.

As another example, the controller 1800 may use the cliff sensor to determine a lifting phenomenon of the mobile robot.

The sensing unit 1400 may include a camera 1406. In this connection, the camera may mean a two-dimensional camera sensor. The camera 1406 is disposed on one face of the robot cleaner and acquires image information associated with a region around the body while moving.

Image data in a predetermined format is generated by converting an image input from an image sensor disposed in the camera 1406. The generated image data may be stored in the memory 1700.

In one example, the sensing unit 1400 may include a 3-dimensional depth camera (3D depth camera) that calculates a perspective distance between the robot cleaner and an imaging target. Specifically, the depth camera may capture a 2-dimensional image associated with the region around the body, and may generate a plurality of 3-dimensional coordinate information corresponding to the captured 2D image.

In an embodiment, the depth camera may include a light source 1402 that emits light and a sensor 1404 that receives the light from the light source 1402, and analyze an image received from the sensor 1404, thereby measuring a distance between the robot cleaner and the imaging target. Such 3D depth camera may be a 3D depth camera in a time of flight (TOF) scheme.

In another embodiment, the depth camera may include, together with the sensor 1404, the light source 1402 that irradiates an infrared ray pattern, that is, an infrared ray pattern emitter. The sensor 1404 may measure the distance between the robot cleaner and the imaging target by capturing a shape of the infrared ray pattern irradiated from the infrared ray pattern emitter projected onto the imaging target. Such 3D depth camera may be a 3D depth camera in an infrared (IR) scheme.

In another embodiment, the depth camera may be formed in a stereo vision scheme in which at least two cameras that acquire the existing 2-dimensional images are arranged and at least two images respectively acquired from the at least two cameras are combined with each other to generate the 3-dimensional coordinate information.

Specifically, the depth camera according to the embodiment may include a first pattern irradiating unit that irradiates light of a first pattern downward toward the front of the body, a second pattern irradiating unit that irradiates light of a second pattern upward toward the front of the body, and an image acquisition unit that acquires an image of the front of the body. Thus, the image acquisition unit may acquire an image of a region into which the light of the first pattern and the light of the second pattern are incident.

Figure 5:
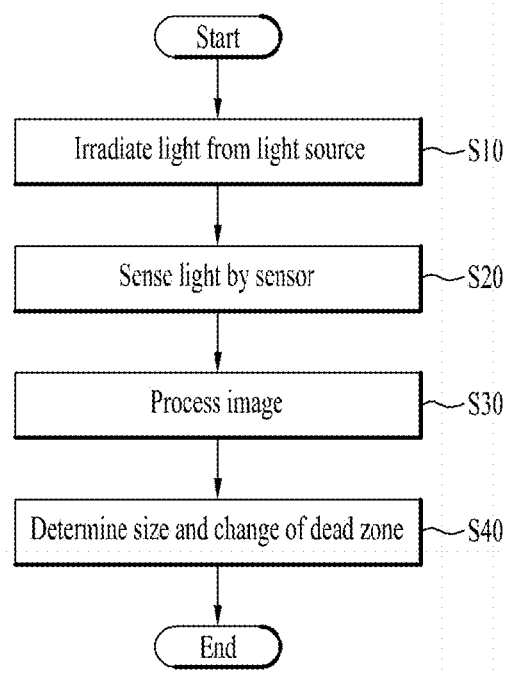
FIG. 5 is a control flowchart according to an embodiment.

FIG. 5 is a control flowchart according to an embodiment.

Referring to FIG. 5, in an embodiment, the robot cleaner irradiates light from a light source 1402 while traveling (S10).

Then, the light irradiated from the light source is reflected on an object and then received by the sensor 1404. That is, the sensor 1404 senses the light of the light source 1402 (S20).

Subsequently, the controller 1800 may perform image processing on information acquired from the sensor 1404, and determine a size and a change of a dead zone (S40).

The image processing may include processing, by the controller 1800, of an image received from the sensor 1404 to contain a distance value of an individual location. That is, the image acquired by the sensor 1404 may have a wide plane shape, and a distance value may be calculated for each coordinate and be matched with each coordinate of the image.

The dead zone will be described in detail with reference to FIGS. 6 to 8.

Figure 6:
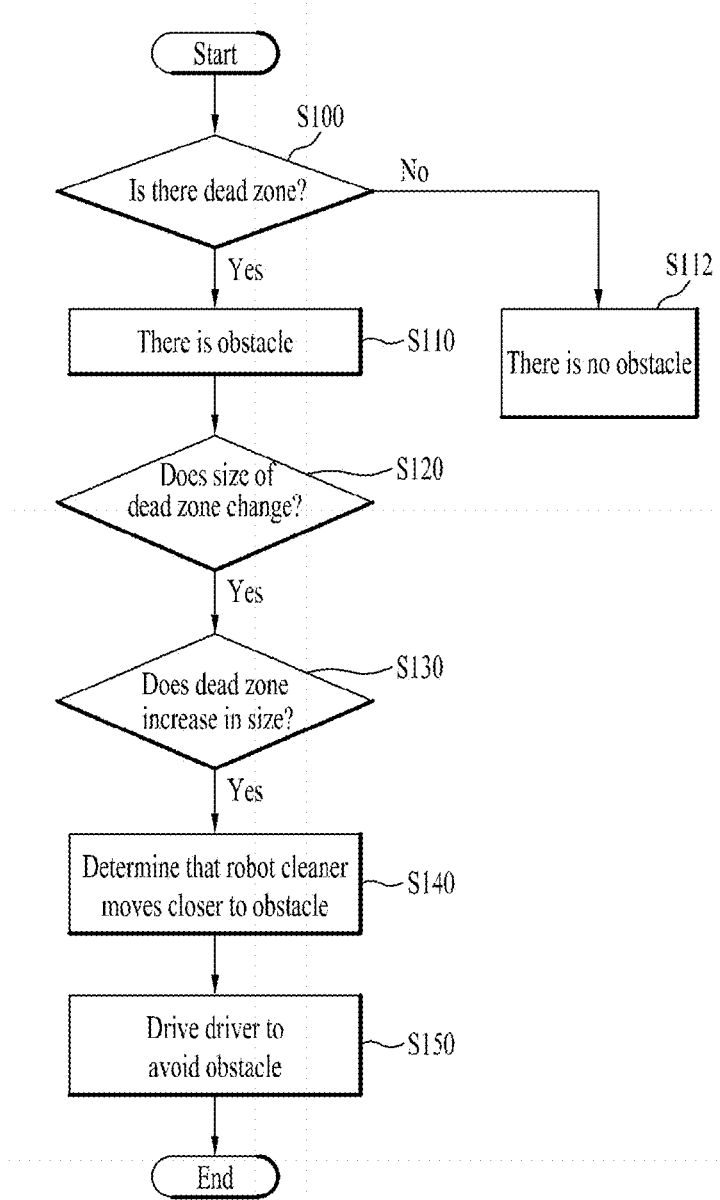
FIG. 6 is a control flowchart for specifically illustrating FIG. 5.
Figure 7A:
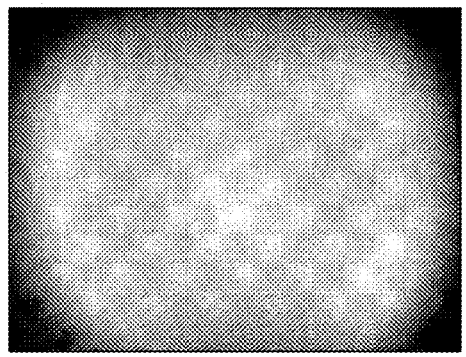
FIGS. 7A to 7D are views for illustrating information sensed by a sensor.
Figure 7B:
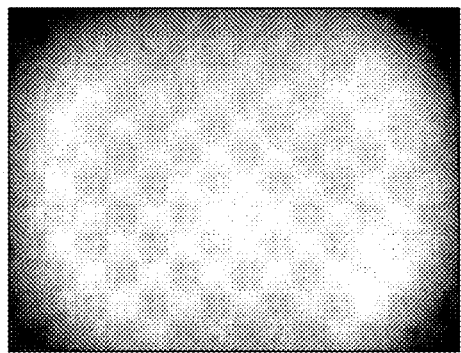
Figure 7C:
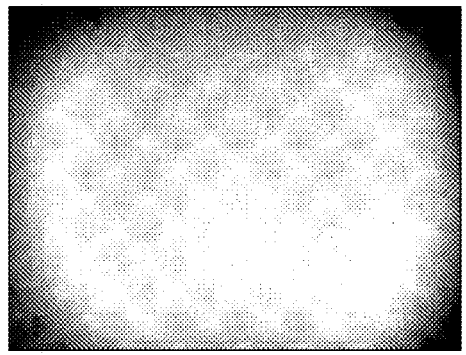
Figure 7D:
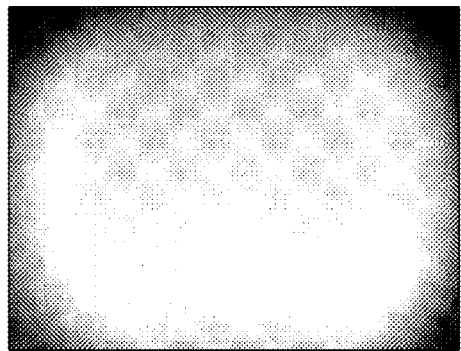
Figure 8A:
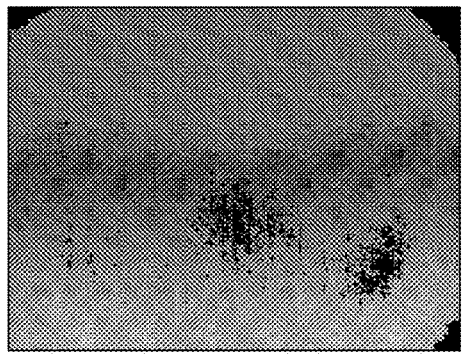
FIGS. 8A to 8D are views for illustrating an image processed by a controller.
Figure 8B:
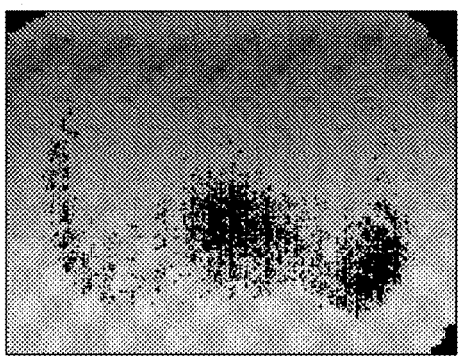
Figure 8C:
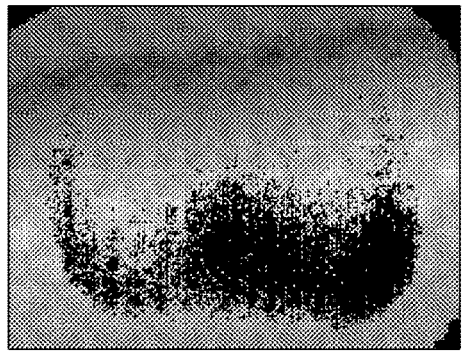
Figure 8D:
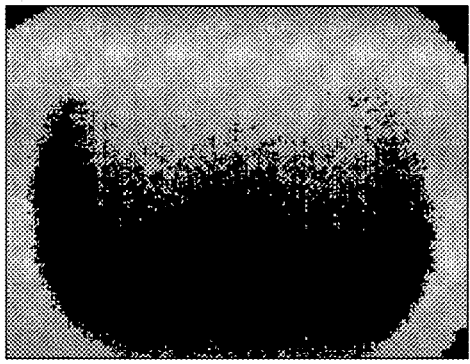

FIG. 6 is a control flowchart for specifically illustrating FIG. 5. In addition, FIG. 7 is a view for illustrating information sensed by a sensor. In addition, FIG. 8 is a view for illustrating an image processed by a controller.

The light irradiated from the light source 1402 and then reflected through the object to be irradiated is received by the sensor 1404 as shown in FIG. 7. Because the sensor 1404 receives the light, FIG. 7 is represented to have only a difference in illuminance. In (a) in FIG. 7, a central portion is represented to be relatively bright. It may be seen that a brightly represented portion increases from (b) in FIG. 7 to (d) in FIG. 7. FIG. 7 represents a state in which the robot cleaner is approaching the obstacle. As the robot cleaner approaches the obstacle more, the brightly represented portion increases.

The brightly represented portion as shown in FIG. 7 may mean the dead zone, and the dead zone may mean a portion sensed to have a brightness higher than a reference value. That is, when an amount of light received by the sensor is equal to or above a certain value or when the light is rapidly reflected and a large amount of light is received, the user and the like may set that the obstacle is near. In this connection, a level of brightness may vary based on a level desired by the user. For example, when the user wants the robot cleaner to move closer to the obstacle, the user may increase the level of brightness when setting the dead zone. On the other hand, when the user wants the robot cleaner not to move close to the obstacle, the user may set the dead zone dark.

FIG. 8 represents a state in which the information received from the sensor 1404 in FIG. 7 is image-processed by the controller 1800. That is, it may be seen that a portion represented in black increases from (a) in FIG. 8 to (d) in FIG. 8 while the brightly represented portion increases from (a) in FIG. 7 to (d) in FIG. 7.

In other words, the dead zone may mean a region represented in black. Therefore, when the dead zone becomes larger, it may be determined that the obstacle becomes closer. In one example, the dead zone may mean a region whose distance is not able to be measured by the controller 1800. This is because a lot of light is received by the sensor 1404 because a distance between the obstacle and the robot cleaner is less than a certain distance. Therefore, the distance of the obstacle less than the certain distance is not able to be calculated by the light received by the sensor 1404.

The controller 1800 may determine whether there is the dead zone based on the processed image (S100).

When there is the dead zone, that is, the portion represented in black in the processed image, it may be determined that there is the obstacle in the corresponding portion (S110). On the other hand, when there is no dead zone, it may be determined that the obstacle does not exist (S112).

In one example, when it is determined in S110 that there is the obstacle because there is the dead zone, the robot cleaner determines whether the size of the dead zone changes while traveling (S120).

The robot cleaner may continuously receive the information through the sensor 1404 while traveling. Because the sensor 1404 continuously receives the information, it may be seen that the received information changes as shown in FIG. 7. Previously acquired information and subsequently acquired information may be compared with each other to determine the change in the size of the dead zone.

As shown in FIGS. 7 and 8, whether the dead zone is increased may be determined (S130).

For example, when the dead zone increases as shown in FIGS. 7 and 8, and when the robot cleaner continuously travels in a current direction, it may be determined that the robot cleaner moves closer to the obstacle (S140).

Accordingly, the controller 1800 may adjust the robot cleaner to avoid the obstacle through the driver 1300 (S150). That is, the robot cleaner may be moved such that the size of the dead zone is reduced by changing a direction of the robot cleaner by the driver 1300.

In one example, the controller 1800 is able to drive the driver 1300 such that the robot cleaner does not avoid the obstacle when the size of the dead zone is less than a certain size and avoids the obstacle when the size of the dead zone is greater than the certain size. The controller 1800 continuously senses the dead zone, but basically, there is no dead zone when there is no obstacle around the robot cleaner. Then, when the robot cleaner travels and encounters the obstacle, the dead zone occurs. Therefore, when the size of the dead zone is smaller than the certain size, it may be predicted that the obstacle is not located at a location enough to contact the robot cleaner, so that the robot cleaner may travel more toward the obstacle. When the robot cleaner continuously travel in the corresponding direction, the size of the dead zone increases. In this case, when the size of the dead zone reaches a size set by the user or the like, it may be determined that the robot cleaner has sufficiently approached the obstacle, so that the robot cleaner may avoid the obstacle through the driver 1300.

The present disclosure may not be limited to the embodiment described above. As may be seen from the appended claims, the present disclosure may be modified by a person having ordinary knowledge in the field to which the present disclosure belongs, and such modification may belong to the scope of disclosure.

The invention claimed is:

1. A robot cleaner comprising:
a light source for irradiating light;
a sensor for sensing that the light irradiated from the light source is reflected;
a driver for moving the robot cleaner; and
a controller configured to process an image using the light sensed by the sensor to calculate a distance value of an individual location of the corresponding image,
wherein it is determined that there is an obstacle when there is a dead zone in the image processed by the controller,
wherein the dead zone means a region whose distance is not able to be measured by the controller because the region has a brightness greater than a reference value,
wherein the controller is configured to determine whether a size of the dead zone changes, and the size of the dead zone increases as the robot cleaner moves toward the obstacle, and
wherein the controller is configured to drive the driver such that the obstacle is avoided when the size of the dead zone is greater than a certain size.

2. The robot cleaner of claim 1, wherein the dead zone means a region represented in black in the image processed by the controller.

3. The robot cleaner of claim 1, wherein it is determined that the robot cleaner approaches the obstacle when the dead zone increases in the image processed by the controller.

4. The robot cleaner of claim 1, wherein it is determined that the obstacle is located within a predetermined distance when there is the dead zone in the image processed by the controller.

5. The robot cleaner of claim 1, wherein the driver moves the robot cleaner such that the size of the dead zone is reduced.

6. A method for controlling a robot cleaner, the method comprising:
irradiating, by a light source, light;
receiving, by a sensor, the light irradiated from the light source and reflected on an object;
processing an image received from the sensor to contain a distance value of an individual location; and
identifying that there is a dead zone in the image-processed information and whether a size of the dead zone changes; and
moving the robot cleaner,
wherein it is determined that there is an obstacle when there is the dead zone,
wherein the size of the dead zone increases as the robot cleaner moves toward the obstacle,
wherein the dead zone means a region whose distance is not able to be measured by a controller because the region has a brightness greater than a reference value, and
wherein the moving of the robot cleaner includes moving the robot cleaner to avoid the obstacle when the size of the dead zone is greater than a certain size.

7. The method of claim 6, wherein the dead zone means a region represented in black.

8. The method of claim 6, wherein it is determined that the robot cleaner approaches the obstacle when the dead zone increases.

9. The method of claim 6, wherein the moving of the robot cleaner includes moving the robot cleaner such that the size of the dead zone is reduced.

* * * * *